J. C. MARTIN, Jr.
PLUG COCK.
APPLICATION FILED FEB. 5, 1921.
1,416,732.
Patented May 23, 1922.
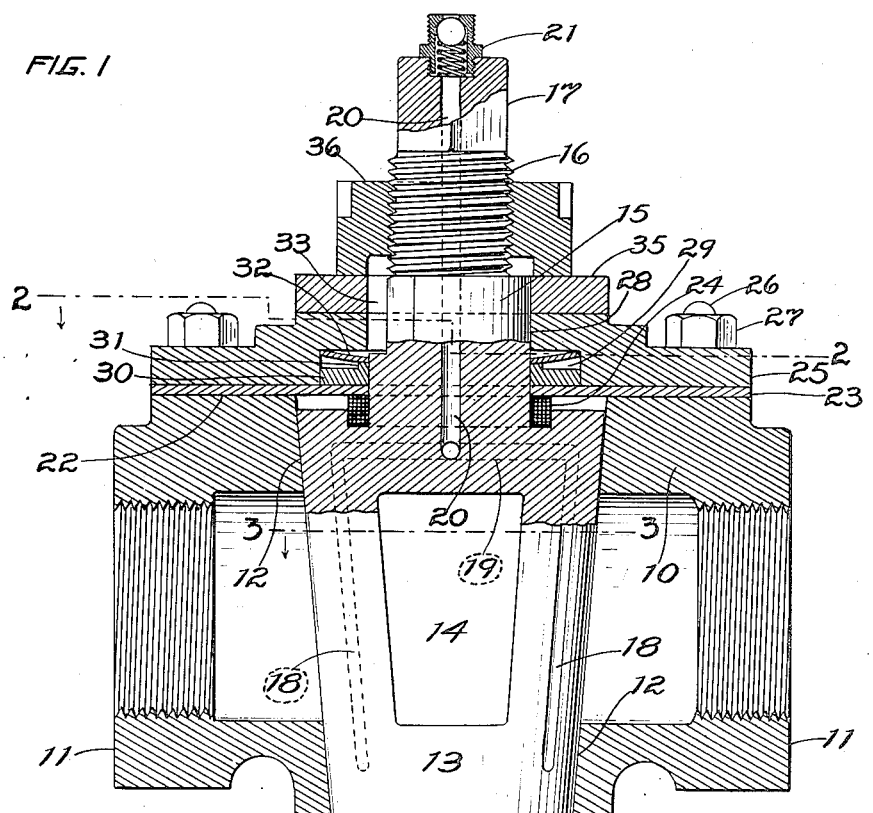
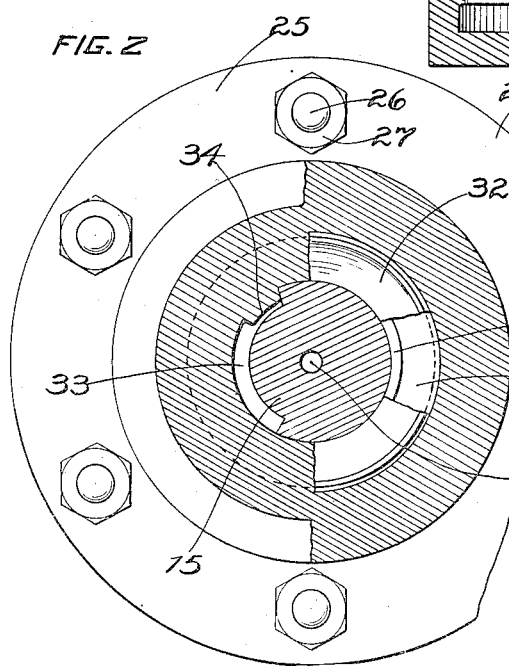
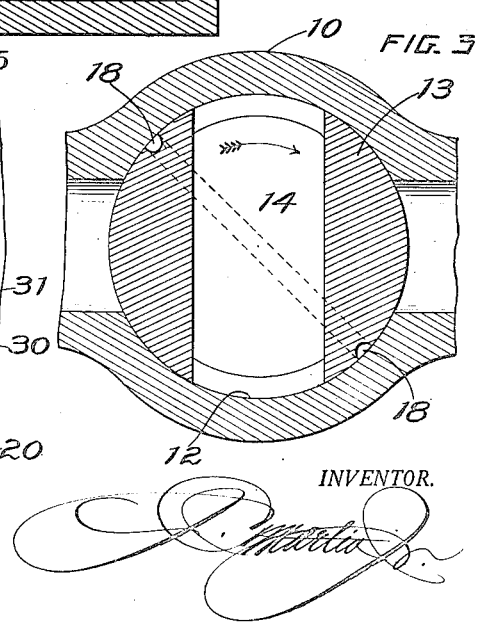
INVENTOR.

UNITED STATES PATENT OFFICE.

JESSE C. MARTIN, JR., OF SAN FRANCISCO, CALIFORNIA.

PLUG COCK.

1,416,732.   Specification of Letters Patent.   Patented May 23, 1922.

Application filed February 5, 1921. Serial No. 442,662.

*To all whom it may concern:*

Be it known that I, JESSE C. MARTIN, Jr., a citizen of the United States, and a resident of San Francisco, county of San Francisco, and State of California, have invented certain new and useful Improvements in Plug Cocks.

The hereinafter described invention relates to closures in pipe lines for stopping or throttling the fluid flow therethrough embodying constructive improvements over my United States Letters Patent No. 1,365,116, entitled "Plug cocks," issued January 11th, 1921.

One of the objects of the invention is to provide better means for introducing the lubricant forced under high pressure between the plug and plug seat surfaces so that, after the lubricant is introduced through the ports provided for its movement, it will not pass back and waste out of its inlet due to the pressure built up in the ports when it is forced in, it being desirable that this pressure, so far as possible, be retained in the lubricant ducts or passages so as to automatically continue the lubricant advance to the plug and plug seat surfaces after the grease gun is removed, and in the accomplishment of this, I provide a check valve controlled lubricant inlet which will prevent the lubricant exit therethrough after the high pressure grease gun is removed.

A further object of the invention is to provide a diaphragm between the end of the plug and the plate affixed to the casing which will form a tight joint between the casing and plate, as well as a movable tight joint between the diaphragm and the end of the plug, thereby effectively serving to keep the lubricant pressure up within the valve by checking its passage in this direction, as well as stopping any fluid pressure escapement to the atmosphere by the end of the plug, the constancy of the movable tight joint being assured by a resilient member which presses the diaphragm against the joint surface on the plug, automatically compensating for any wear, as well as eliminating the use of a gland and stuffing box which has to be periodically screwed up and repacked, and owing to the inaccessible places where these valves are installed such packing is frequently neglected, detracting materially from the general efficiency of the valve.

For the purpose of better understanding the invention, reference is hereby made to the accompanying drawing, in which—

Fig. 1 is a vertical section taken through the center of a plug cock of my improved construction.

Fig. 2 is a horizontal section taken approximately on the line 2—2 of Fig. 1.

Fig. 3 is a horizontal section taken approximately on the line 3—3 of Fig. 1.

Referring by numerals to the accompanying drawings, 10 designates the body or casing of the cock, the same being provided with oppositely arranged internally threaded tubular portions, 11, for pipe connections, and centrally arranged within the body or casing is a conical valve seat, 12.

Fitting snugly within the valve seat and adapted to rotate therein is a conical plug, 13, having a diametrically arranged opening, 14, that is adapted to register with the openings through the tubular members, 11, and formed integral with and projecting upwardly from the body of the plug is a short cylindrical stem, 15.

Projecting upwardly from the top of this stem, 15, is an externally threaded stem portion, 16, and projecting upwardly from the upper end thereof is a square or non-circular member, 17, that is adapted to receive a valve operating member such as a hand lever or wrench.

Formed in the outer face of the body of plug 13, are diametrically opposed vertically disposed grooves, 18, the lower ends of which terminate in a plane slightly above the lower end of the plug. The upper ends of these lubricant receiving grooves communicate with the ends of a diametrically arranged duct or passageway, 19, the latter being formed through the upper portion of the plug, 13, and this duct or passageway, 19, intersects the lower end of an axially disposed duct or passageway, 20, that is formed through stem, 15, threaded member, 16, and the angular terminal portion, 17, of the stem.

The ducts or passageways just described provide means for delivering lubricant, such as grease or heavy oil, directly to the conical valve seat, 12, and the external surface of plug, 13, said lubricant being delivered into the upper end of duct or passageway, 20, through the check valve, 21, by means of a grease gun, the lubricant being retained in the ducts or passageways after the removal of the grease gun by the check valve, 21.

Grooves, 18, are disposed on the surface of plug, 13, so that if said plug is shifted from closed to open position and vice versa, said passages will at no time register or communicate with the openings through the tubular portion, 11, of the valve housing thus holding the grease or liquid lubricant effectually within said grooves, and as the lubricant is also kept from passing out of its inlet by the check valve, 21, proper lubrication to the plug and plug seat surfaces is assured at all times.

The top housing, 10, surrounding the conical opening, 12, is provided with a relatively flat surface, 22, and positioned thereupon is the outer portion of a diaphragm, 23, that is perforated or provided with a centrally arranged opening for accommodation of the stem, 15.

Positioned immediately on top of diaphragm, 23, is a plate, 25, the same being secured to the casing, 10, in any suitable manner, preferably by means of bolts or studs, 26, and nuts, 27, and formed in the center of this plate is an opening, 28, for the accommodation of the stem, 15.

Formed on the under side of plate, 25, around the centrally arranged opening therein is an annular recess, 29. Arranged within this recess and resting upon the inner edge of the diaphragm, 23, is an annular plate, 30, provided adjacent to its inner edge with an upwardly projecting rib or flange, 31, which latter serves as a bearing for the inner lower edge of a resilient member, preferably a dished metal ring, 32.

When the parts of the cock are properly assembled and nuts, 27, are tightened to secure plate, 25, on housing, 10, the pressure on the outer upper edge of the resilient pressure member, 32, imparts downward pressure to ring or annular plate, 30, and this pressure is transmitted directly to the inner edge of the diaphragm, 23, and as a result a movable fluid pressure tight joint is maintained between the inner surface of the diaphragm and the end of plug, 13. Diaphragm, 23, also provides a joint between the plate, 25, and housing, 10.

The diaphragm, 23, may be constructed of any suitable material; for instance, rubber, duck, asbestos, lead or copper, as best adaptable to the character of service in which the valve is applied.

Formed in the upper portion of stem, 15, is a horizontally disposed arcuate slot or recess, 33, the length of which is slightly greater than ninety degrees, and projecting into said slot or recess from the adjacent inner edge of plate, 25, is a lug, 34.

The parts just described are arranged so that lug, 34, occupies a position at one end of the slot or recess when the valve is in fully closed position, and when said valve is rotated a quarter of a turn into full open position, said lug is positioned in the opposite end of said slot or recess.

Positioned on top of plate, 25, around the upper portion of stem, 15, is an auxiliary plate, 35, that is carried by stem, 15, in any suitable manner, and screw seated upon the threaded portion of member, 16, is a nut, 36, the under side of which bears directly on top of plate, 35, thus holding the various movable parts of the valve in proper assembled relation.

In the operation of my improved valve it is only necessary to engage the angular upper end, 17, of the stem with a suitable handle or tool and rotate the plug, 13, so as to open or close the passageway through the housing, 10, or into position to control the flow of fluid through said housing. At all times the resilient member, 32, exerts constant pressure on the inner portion of the diaphragm to maintain a fluid tight joint between the plug and the plate, 25, and which latter serves as a closure for the end of the valve housing and retains the plug in proper operative position within said housing.

While the improvements herein set out are shown and described in connection with a plug cock in which the plug is rotatably held in the plug seat against vertical movement by a plate secured to the body of the cock which takes the thrust and prevents forcing the plug in the plug seat, it is obvious that these improvements are equally applicable to any plug cock which is arranged with lubricant passages which terminate against two seated valves, namely, the plug against the plug seat on the one end and the check valve against its seat on the other end, the same purposes being served by the invention whether the plug be seated upwardly with the large diameter of the taper at the bottom or downwardly with the small diameter of the taper at the bottom as when the cock is set in normal operating position in a pipe line, as shown in Fig. 1.

It will be readily understood that minor changes in the size, form and construction of the various parts entering into my improvements may be made and substituted for those herein shown and described without departing from the spirit of the invention.

What I claim is:—

1. In a plug cock, a plug, a plug seat, means for confining lubricant under pressure between the plug and plug seat surfaces, a filling inlet communicating with said lubricant confining means, means for closing said filling inlet, and fluid tight means for the attachment of a lubricant compressor to said cock in communication with said inlet.

2. In a plug cock, a casing having a plug seat, a plate affixed to the casing, a diaphragm between the plate and the casing, a plug seated in the casing and rotatably and adjustably held by the plate against vertical movement and resilient means for seating the diaphragm against the plug, lubricant passages between the plug and plug seat surfaces, a lubricant filling inlet communicating with said passages and a check valve in the filling inlet.

3. In a plug cock, a casing having a plug seat, a plate affixed to the casing, a diaphragm between the plate and the casing, a plug seated in the casing and rotatably held by the plate against vertical movement, a joint ring between the diaphragm and the end of the plug and resilient means for seating the diaphragm against the ring.

4. In a plug cock, a casing having a plug seat, a plate affixed to the casing, a diaphragm between the plate and the casing, a plug seated in the casing and rotatably and adjustably held by the plate against vertical movement, a joint ring between the diaphragm and the end of the plug and resilient means for seating the diaphragm against the ring.

5. In a plug cock, a casing having a plug seat, a plate affixed to the casing, a diaphragm between the plate and the casing, a plug seated in the casing and rotatably held by the plate against vertical movement, a joint ring between the diaphragm and the end of the plug, resilient means for seating the diaphragm against the ring, lubricant passages between the plug and plug seat surfaces, a lubricant filling inlet communicating with said passages and a check valve in the filling inlet.

JESSE C. MARTIN, JR.

Witnesses:
W. W. HEALEY,
T. D. GARLICHS.